US005667209A

United States Patent [19]

Lenzkes

[11] Patent Number: 5,667,209

[45] Date of Patent: Sep. 16, 1997

[54] CLAMPING DEVICE FOR SECURELY CLAMPING A WORKPIECE ON A CLAMPING TABLE

[75] Inventor: Thomas Lenzkes, Dublin, Ireland

[73] Assignee: Shanview Patents Limited, Dublin, Ireland

[21] Appl. No.: 565,302

[22] Filed: Nov. 27, 1995

[30] Foreign Application Priority Data

Dec. 1, 1994 [DE] Germany .......................... 44 42 803.0

[51] Int. Cl.[6] ........................................ B23Q 3/02

[52] U.S. Cl. .............................. 269/93; 269/94; 269/238

[58] Field of Search .............................. 269/91–94, 237, 269/239, 99–100, 81

[56] References Cited

U.S. PATENT DOCUMENTS

| | | | |
|---|---|---|---|
| 1,490,063 | 4/1924 | Tower . | |
| 2,365,079 | 12/1944 | Huber | 269/94 |
| 2,872,854 | 2/1959 | Ho Chow . | |
| 3,380,730 | 4/1968 | Carver . | |
| 4,432,538 | 2/1984 | Sequin . | |
| 4,470,586 | 9/1984 | Spencer | 269/94 |
| 5,037,074 | 8/1991 | Lenzkes | 269/94 |

FOREIGN PATENT DOCUMENTS

| | | |
|---|---|---|
| 03 91 346 | 4/1990 | European Pat. Off. . |
| 2 463 408 | 2/1981 | France . |
| 2 612 439 | 9/1988 | France . |
| 2808667 | 9/1978 | Germany . |
| 28 08 667 | 9/1978 | Germany . |
| 30 03 626 | 8/1981 | Germany . |
| 597 976 | 4/1978 | Switzerland . |

OTHER PUBLICATIONS

"Flexibel bis zur Aufspannung", Modulare Vorrichtungs--systeme im Verleich: Stand der Technik, Trends, Tendenzen, Dr–Ing Thomas Buchholz, Karlsruhe, 1988.

*Primary Examiner*—Robert C. Watson
*Attorney, Agent, or Firm*—Thomas, Kayden, Horstemeyer & Risley

[57] ABSTRACT

A device for securely clamping a workpiece (2) on a clamping table (1), which device has a guide shoe (3) which can be fastened on the clamping table (1) and has T-slot-shaped clearances (35) which continue, in a symmetrical arrangement, over the length of the guide shoe. The device also has a clamping claw (8) which is designed as a tilting lever and has a clamping leg (10) and a bracing leg (9). A clamping bolt (11) is provided which passes through the clamping leg (10) in the region of its free end and, in the clamping position, fixes the clamping claw (8) relative to the guide shoe (3) and securely clamps the workpiece (2). A bearing plate (4) is provided between the guide shoe (3) and clamping claw (8) and the bearing plate (4) is guided in a sliding manner in the T-slot-shaped clearances (35) by means of strip-like protrusions (21). The plate (4) carries a bearing (6) at one end region, in which bearing the clamping claw (8) is mounted such that it can be pivoted with respect to the bearing place (4), and is extended as far as the clamping bolt (11) at its other end region, with the result that the clamping bolt (11), in the clamping position, is supported on the bearing plate (4).

10 Claims, 8 Drawing Sheets

CLAMPING DEVICE FOR SECURELY CLAMPING A WORKPIECE ON A CLAMPING TABLE

FIELD OF THE INVENTION

The invention relates to a device for securely clamping a workpiece on a clamping table, having a guide shoe which can be fastened on the clamping table and exhibits T-slot-shaped clearances which continue, in a symmetrical arrangement, over the length of the guide shoe, having a clamping claw which is designed as a tilting lever and exhibits a clamping leg and a bracing leg, and having a clamping bolt which passes through the clamping leg in the region of its free end and, in the clamping position, fixes the clamping claw relative to the guide shoe and securely clamps the workpiece. Such clamping devices are used, in particular in the material-removing machining of workpieces, but also in many other areas, for example if an injection mould is securely clamped on a clamping table. The term workpiece is to be understood here in a very broad sense. It may, quite generally, constitute items for clamping, in particular also tools or such parts which are, in turn, used during a machining operation.

BACKGROUND OF THE INVENTION

A clamping device of the type described in the introduction is known from EP 0 391 346 B1. The clearances continue over the length of the guide shoe and form a constituent part of a T-slot-shaped cross-sectional configuration. The clamping claw is of a curved configuration, in which the free ends of the bracing leg and of the clamping leg are arranged at a higher level than the continuations which engage directly into the clearances. The continuations are of an approximately elliptical cross-section with the major axis being aligned approximately in the longitudinal direction of the clamping claw. The clamping claw has a return spring which acts counter to the clamping direction, is supported on the guide shoe and also fulfils the function of fixing the clamping claw after displacement in the guide shoe. All that is provided for fastening the guide shoe on the clamping table is a fastening bolt which as a rule, is assigned a sliding block. The fastening bolt can be inserted into one or more through-passages arranged in the front region of the guide shoe. It is thus possible to clamp any point of a workpiece onto a clamping table in a space around the clamping device. The clamping claw can be displaced in a stepless manner in the guide shoe in the longitudinal direction and fixed in the clamping position. In a vertical direction, a correspondingly large vertical region of workpieces of different heights can be clamped, it being possible optionally to clamp into the guide shoe clamping claws which are bent in different manners. The displacement of the clamping claw in the horizontal direction relative to the guide shoe is restricted on paths in which the continuations engaging into the clearances are still located securely in guide shoes. The disadvantage with this clamping device is that the displacement path of the clamping claw in the guide shoe is restricted. The result of this is that it is possible to clamp a workpiece only in its border region and, in the direction of its central region, only in a length corresponding to the bracing leg. In the case of clamping heights of different sizes, clamping claws which are bent in different manners have to be kept in stock and combined with the guide shoe. This involves a high degree of outlay and does not make it any easier, for example, to clamp a workpiece in machining positions at different heights. Linear contact takes place between the elliptical continuations and the T-slot-shaped clearances, with the result that it is necessary to design, in particular, the side walls of the guide shoe to be very thick. The floor of the guide shoe too is of a relatively great thickness. It is configured in a continuous manner because the clamping bolt can be supported on the continuous floor step solder in each clamping position. This results in the weight of the guide shoe being relatively great.

DE 28 08 667 A1 discloses a clamping device for a machine tool, of which the guide shoe does not exhibit a planar continuous bearing surface for mounting on a clamping table, but in which a single fastening bolt engages in the guide shoe in an elevated position. In order to clamp particularly high workpieces, provision is made for a foot and an intermediate block which are assigned to the guide shoe and are matched to the same.

These three differently designed parts are correspondingly stacked one upon the other and fastened on one another, with the result that relatively high clamping heights can then be provided for.

The object of the invention is to develop further a clamping device of the type described in the introduction such that, by means of the clamping claw, a wider range of clamping positions can be covered in the horizontal direction or, in other words, it is possible to span workpieces with more widely variable clamping positions, starting with the clamping of just a border region of the workpiece and continuing, to a certain extent, into the central region of the workpiece.

SUMMARY OF THE INVENTION

According to the invention, this is achieved, in the case of the clamping device of the type described in the introduction, in that provided between guide shoe and clamping claw is a bearing plate which is guided in a sliding manner in the T-slot-shaped clearances by means of strip-like protrusions, carries a bearing at one end region, in which bearing the clamping claw is mounted such that it can be pivoted with respect to the bearing plate, and is extended as far as the clamping bolt at its other end region, with the result that the clamping bolt, in the clamping position, is supported on the bearing plate.

By means of the novel clamping device, the horizontal clamping range in which clamping positions can be assumed is made comparatively greater in two directions. The bearing plate arranged between the clamping claw and guide shoe not only makes it possible for clamping positions to be assumed when the bearing plate is located within the boundaries of the guide shoe. In addition, the bearing plate can be displaced forwards out of the guide shoe to a certain extent, with the result that the hearing, which receives the clamping claw, is located outside the boundaries of the guide shoe. It is thus possible to clamp workpieces more in the direction of their central region. Conversely, that is to say in the opposite direction, the bearing plate can be displaced rearwards in the guide shoe such that only part of the bearing plate is still located within the guide shoe. The rear end of the bearing plate and the clamping leg with the clamping bolt are then located outside the boundaries of the guide shoe. Nevertheless, the clamping bolt can be supported on the bearing plate. This possibility provides for optimally short clamping-in means in the border region of the workpiece, directly adjacent to the arrangement of the guide shoe on the clamping table. It is also possible optionally to combine, and use, with the bearing plate clamping claws with bracing legs which are of different lengths or are even bent, in order to meet special clamping conditions. The interposition of a bearing plate fundamentally improves the loading conditions on the guide shoe.

The former linear contact is replaced by surface contact between guide shoe and bearing plate. In addition, the design of the bearing between the bearing plate and the clamping claw is more appropriate in terms of loading, with the result that surface contact likewise takes place there. The third considerable advantage is that the dimensions of the guide shoe may be smaller in comparison. It can be of a shorter configuration and, generally, be provided with smaller wall thicknesses. It is also possible to design a guide-shoe floor, which faces the clamping table, in a non-continuous manner in order, overall, to achieve a reduction in weight.

A particularly advantageous embodiment of the clamping device is characterized in that a fastening bolt and a sliding block are provided for fastening the guide shoe, and in that the sliding block, if it has a rectangular outline, exhibits at least two pairs .of anchorage continuations which are arranged opposite one another and project with respect to the central region of the block, the geometry of a pair of anchorage continuations being matched to the dimensions of the T-slot-shaped clearances of the guide shoe. The sliding block may thus be used in at least two relative positions. In one relative position, it permits anchorage of the entire device via the guide shoe on the clamping table. The slots in the clamping table are, as a rule, of narrower dimensions than the T-slot-shaped clearances on the guide shoe itself. Said clearances have to be of a relatively large width because the clamping claw, on the one hand, and the bearing plate, on the other hand, have to be of a corresponding width in order to be able to transmit the necessary high clamping forces. By positioning the sliding block in the second use direction, it is, surprisingly, possible to arrange a plurality of guide shoes one above the other and to insert the clamping claw, with the bearing plate, into the uppermost guide shoe if relatively high workpieces have to be clamped. The use of separate intermediate blocks is fully dispensed with.

Another possibility for clamping low and high workpieces exists in the fact that the guide shoe exhibits at least two T-slot-shaped clearances which are arranged one above the other in horizontal planes, continue over the length of the guide shoe and complement one another to form a symmetrically arranged cavity for optionally receiving the clamping claw in two different vertical positions. The guide shoe is configured, as it were, in a multi-storey manner. It exhibits a plurality of T-slot-shaped clearances which are arranged one above the other and into which the bearing plate can (optionally) be inserted with the clamping claw. The guide shoe exhibits a cavity passing through it continuously in the central region, with the result that the insertion of the bearing plate and the pivoting of the clamping claw are in no way impeded. Even if, on such a multi-storey guide shoe, the bearing plate is inserted into the lowermost plane, that is to say into the lowermost T-slot-shaped clearance, the plan view of the clamping claw is given from above and its handling can be effected in the usual manner. This embodiment is particularly advantageous if workpieces have to be clamped in a plurality of positions, differing in terms of their height, in order to be able to carry out different machining operations on the workpiece in an optimum manner.

In all the embodiments, the guide shoe may exhibit a non-continuous floor because the clamping bolt is no longer supported on the floor of the guide shoe, but on the bearing plate. This results in a considerable reduction in weight of the guide shoe. In addition, the dimensions of the side wall of the guide shoe may be smaller in comparison.

The bearing provided between the bearing plate and clamping claw may exhibit convex or spherical guide surfaces which serve for compensating production tolerances and ensure that the free end of the bracing leg, at the clamping location, bears on the workpiece in each case at least with linear contact.

Alternatively, or in addition thereto, the T-slot-shaped clearances of the guide shoe and strip-like protrusions of the bearing plate may also exhibit convex or spherical bearing surfaces. This measure too serves for compensating tolerances and for ensuring an appropriate clamping position.

It is also possible for the T-slot-shaped clearances to be of a dovetail-shaped cross-section in order, in this manner, to ensure that, in each clamping position, the two guide-shoe walls bounding the T-slot-shaped clearances are subjected to bending to the smallest possible extent.

In detail, the bearing of the clamping claw on the bearing plate may comprise bolt-like protrusions on the clamping claw and depressions which are open in the downwards direction at the border and are located in the bearing plate, with the result that the clamping claw can be fitted into the bearing plate. This facilitates and simplifies the combination and assembly of different clamping claws with the respective bearing plate. In addition, cleaning of the parts in the dismantled state can be carried out in a particularly simple manner.

The clamping claw may exhibit, in the region of the bearing, a central web from which the bolt-like protrusions project symmetrically. The bearing plate exhibits, in the region of the bearing, two spaced-apart bearing shells which receive the central web of the clamping claw between them. This not only permits the necessary movement between the clamping claw and the bearing plate, but also reduces the weight of the bearing plate. It is also possible to subdivide the bearing plate or to assemble it from a plurality of parts.

The bearing plate is expediently of a length which corresponds approximately to a third of the length to half the length of the clamping claw. On the other hand, the length of the bearing plate has to correspond to the length of the clamping leg on the clamping claw. It is thus expedient if, in addition, clamping claws of different lengths have identical dimensions between the clamping bolt and the bearing, that is to say the clamping legs of the clamping claws are designed to correspond to one another.

BRIEF DESCRIPTION OF THE DRAWINGS

The invention is further explained and described with reference to preferred exemplary embodiments. In the drawing.

DETAILED DESCRIPTION

Figure 1:
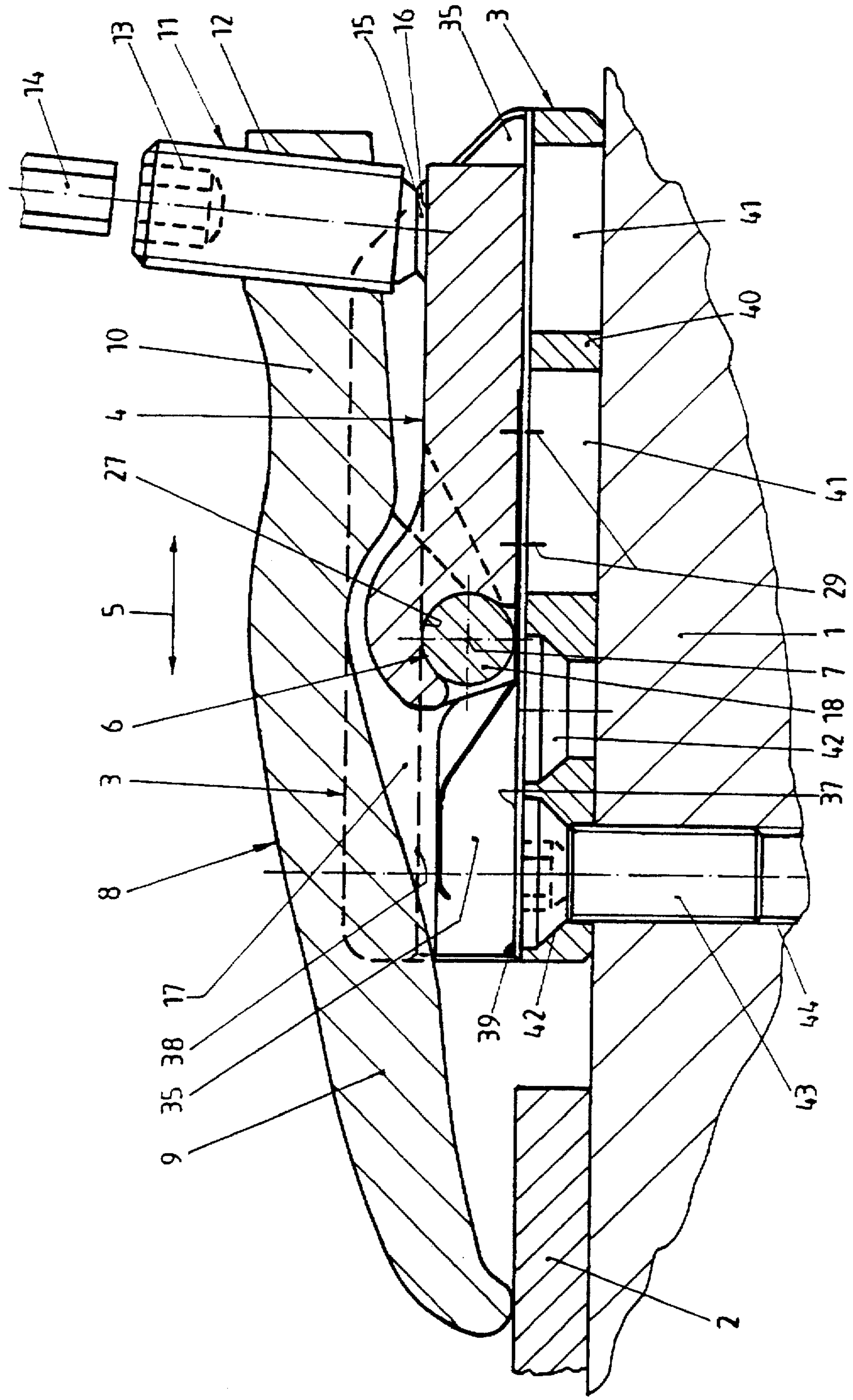
FIG. 1 shows, partly in section, a first embodiment of the device for securely clamping a workpiece on a clamping table.

FIG. 1 shows the device in the clamping position. A workpiece 2 lies on a clamping table 1 in the position provided for machining and is clamped securely by the device.

The device exhibits a guide shoe 3 in which a bearing plate 4 can be displaced in a sliding manner in the direction of a double arrow 5. The bearing plate 4 carries, in its front end region, a bearing 6, about the axis 7 of which a clamping claw 8 is pivotably mounted and supported. The clamping claw 8 is designed in the manner of a tilting lever and, facing the workpiece 2, exhibits a bracing leg 9, of which the front end presses onto the workpiece 2. In the opposite direction, the clamping claw 8 has a clamping leg 10 which is penetrated by a clamping bolt 11. The clamping bolt 11 is guided in a threaded bore 12 at the rear end of the clamping leg. In its upper region, it has an attachment surface 13 for a screwing tool 14, for example a hexagon socket wrench. At the lower end facing the bearing plate 4, the clamping bolt 11 exhibits a supporting body 15 which is mounted in said bolt such that it can be moved at an angle and of which the planar supporting surface 16, in each angular position of the clamping claw 8 about the axis 7 and an axis perpendicular thereto, is supported in a planar manner on the bearing plate 4.

Figure 2:
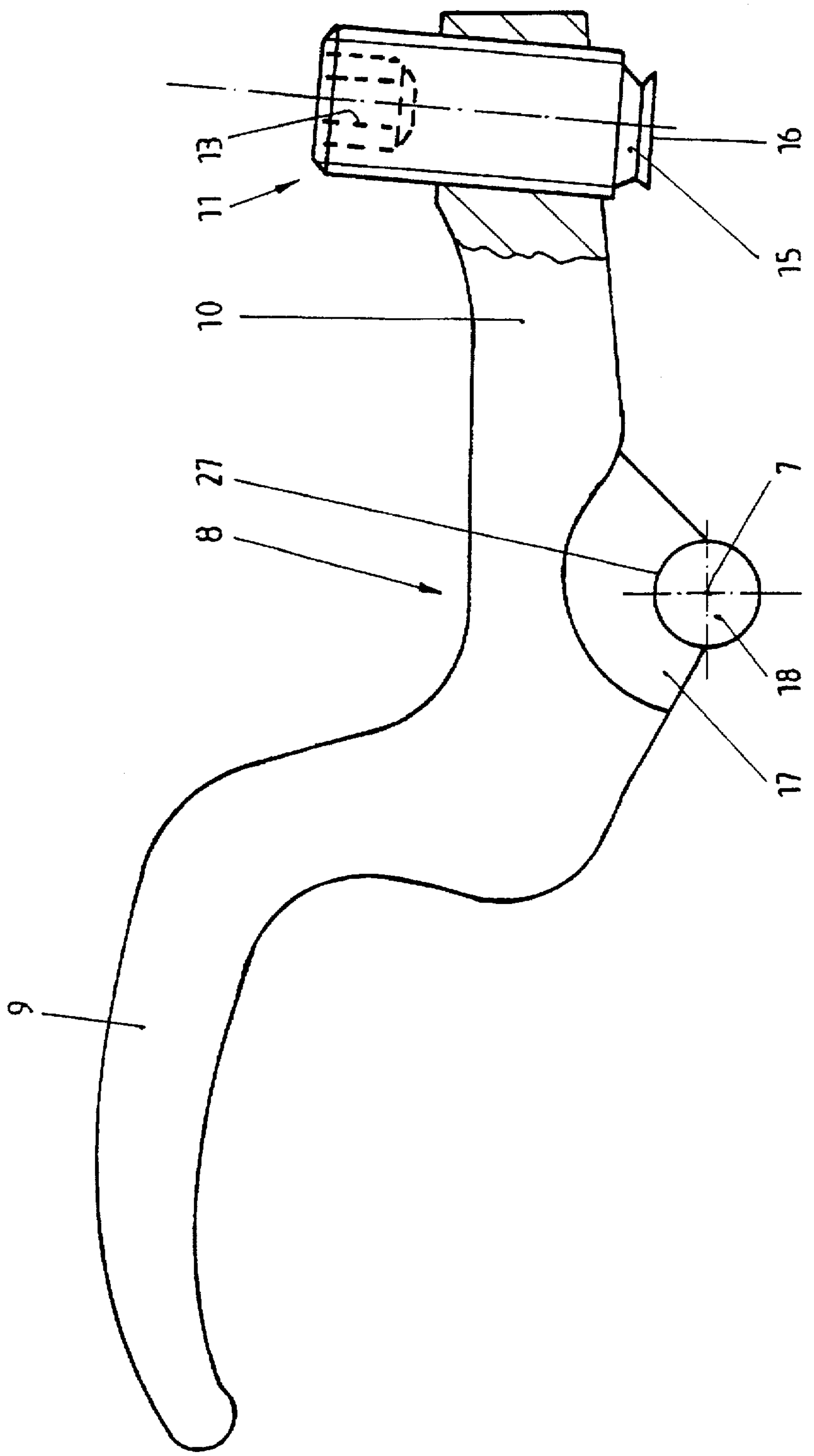
FIG. 2 shows a side view of a modified clamping claw

The clamping claw 8 exhibits, in its central region, a central web 17 from which bolt-like protrusions 18 project symmetrically with respect to a vertical longitudinal centre plane through the clamping claw 8 in accordance with the plane of the drawing in FIG. 1. The bolt-like protrusions 18 are an essential constituent part of the bearing 6. As can be gathered from a comparison of FIGS. 1 and 2, the bracing leg 9 of the clamping claw 8 may be bent in different manners in order optionally to be able to clamp workpieces 2 of different heights. It can further be seen that the clamping claw 8, as an individual part of the device, can be easily released from the bearing 6 and can also be assembled with the bearing 6 of the bearing plate 4 again, which is useful for production and cleaning purposes. It can, at the same time, be seen that, in this manner, clamping claws 8 with bracing legs 9 bent in different manners may optionally be connected to, and used with, the identical bearing plate 4.

Figure 3:
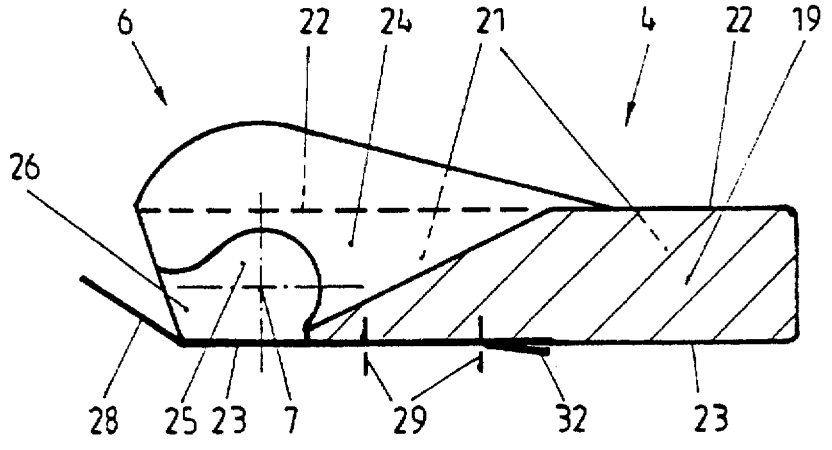
FIG. 3 shows a side view of the bearing plate of the device according to FIG. 1.
Figure 4:
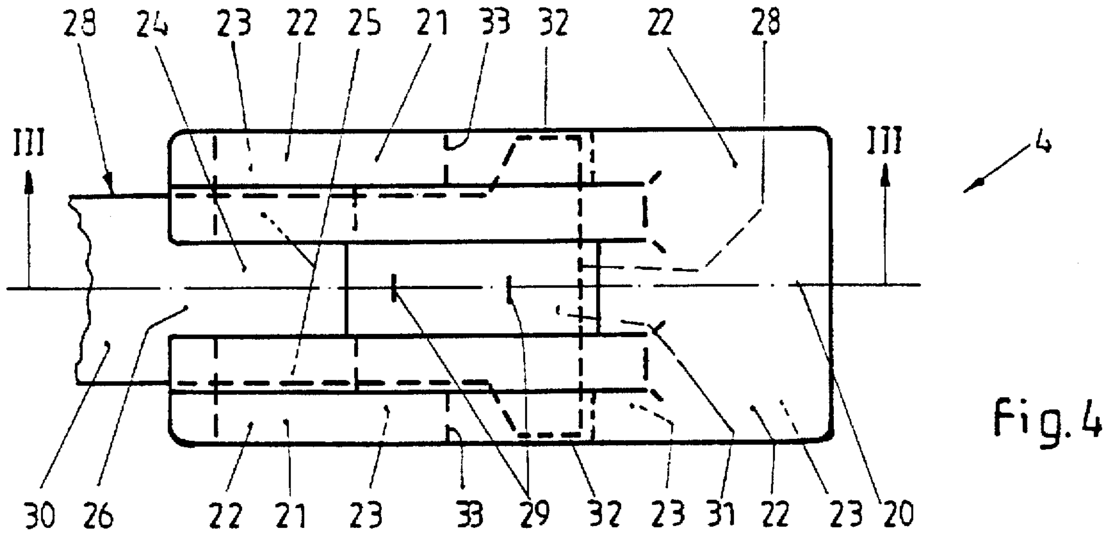
FIG. 4 shows a plan view of the bearing plate according to FIG. 3.
Figure 5:
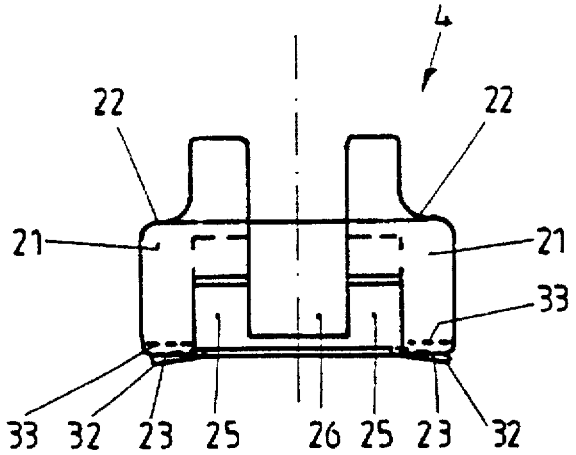
FIG. 5 shows an end view of the bearing plate according to FIG. 3.

The design of the bearing plate 4 can best be seen with reference to FIGS. 3 to 5. The bearing plate 4 exhibits a plate-like basic body 19, of which the length corresponds approximately to half the length of the clamping claw 8. In a symmetrical arrangement with respect to a vertical longitudinal centre plane 20 (FIG. 4), the basic body 19 has two strip-like protrusions 21 which extend virtually over its entire length. The strip-like protrusions exhibit upper guide surfaces 22 and lower guide surfaces 23, which interact with corresponding mating surfaces in the guide shoe 3. Otherwise, the bearing plate 4 exhibits, in its front region facing the bearing 6, a clearance 24 for the through-passage and movement of the central web 17 of the clamping claw 8. The clearance 24 is adjoined by depressions 25 which are arranged in a symmetrical manner with respect to the vertical longitudinal centre plane 20, are open at the border and towards the front and merge into a push-in opening 26, with the aid of which the clamping claw 8 can be inserted into the bearing 6 of the bearing plate 4. In this arrangement, the bolt-like protrusions 18 enter into the depressions 25, which are open at the border. The bolt-like protrusions 18 may exhibit cylindrical, but also, in particular, convex or spherical, guide surfaces 27, with the result that the clamping claw 8 can be moved about the axis 7 and also about an axis located perpendicularly thereto in the vertical longitudinal centre plane 20, in order that the front end of the bracing leg 9 of the clamping claw 8 can be mounted on the workpiece 2 with linear contact.

A spring 28 is fastened, with the aid of rivets 29 which are only indicated, on the bearing plate 4, in corresponding depressions relative to the lower guide surfaces 23. The spring 28 has two functions. Its front part 30, which may be approximately the width of the clamping claw 8 or somewhat less, has the task of pivoting the clamping claw 8 about its axis 7 in the clockwise direction of rotation, with the result that, upon release of the clamping bolt 11, the front end of the bracing leg 9 is raised from the surface of the workpiece 2. The spring 28 thus keeps a supporting surface 16 of the supporting body 15 constantly in abutment against the surface of the basic body 19 of the bearing plate 4. In the rear region 31, the spring 28 exhibits outwardly projecting lugs 32 which can be pivoted into depressions 33, which are only indicated, in the lower guide surfaces 23. The lugs 32 are, however, curved in a prestressed manner such that they project downwards some way out of the depressions 33, as can be seen, in particular, with reference to FIGS. 3 and 5. Said lugs 32 serve, upon displacement of the non-securely clamped bearing plate 4 in accordance with double arrow 5, to produce such friction in the guide shoe 3 that the bearing plate 4, including the clamping claw 8, remains at a standstill in each position at the end of a displacement movement and, even when the device is released from the clamping table 1, the bearing plate 4 is secured in the guide shoe 3, with the result that the unit comprising bearing plate 4 and clamping claw 8 cannot fall out of the guide shoe 3. On the other hand, it is, of course, possible, by applying force, to displace the unit comprising bearing plate and clamping claw 8 in the guide shoe 3 in accordance with double arrow 5 and also to remove said unit from the guide shoe 3. In its-central region, the spring 28 bounds the push-in opening 26 in an elastic manner, so that it is possible to see the third function of the spring 28 here. Upon connection of the clamping claw 8 to the bearing plate 4, that is to say upon passage of the bolt-like protrusions 18 through the push-in opening 26, the spring 28 expands and permits the bolt-like protrusions 18 to pass through. The spring 28 prevents the clamping claw 8 from being able to pass out of its bearing 6 on the bearing plate 4 automatically.

Figure 6:
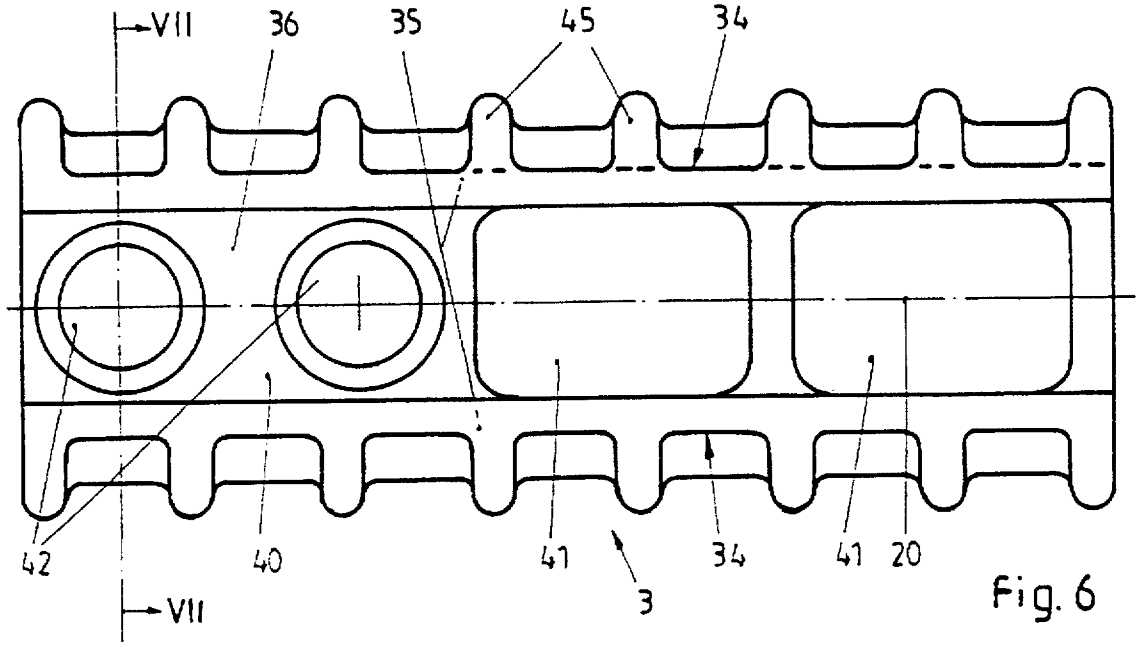
FIG. 6 shows a plan view of an associated guide shoe of the device.
Figure 7:
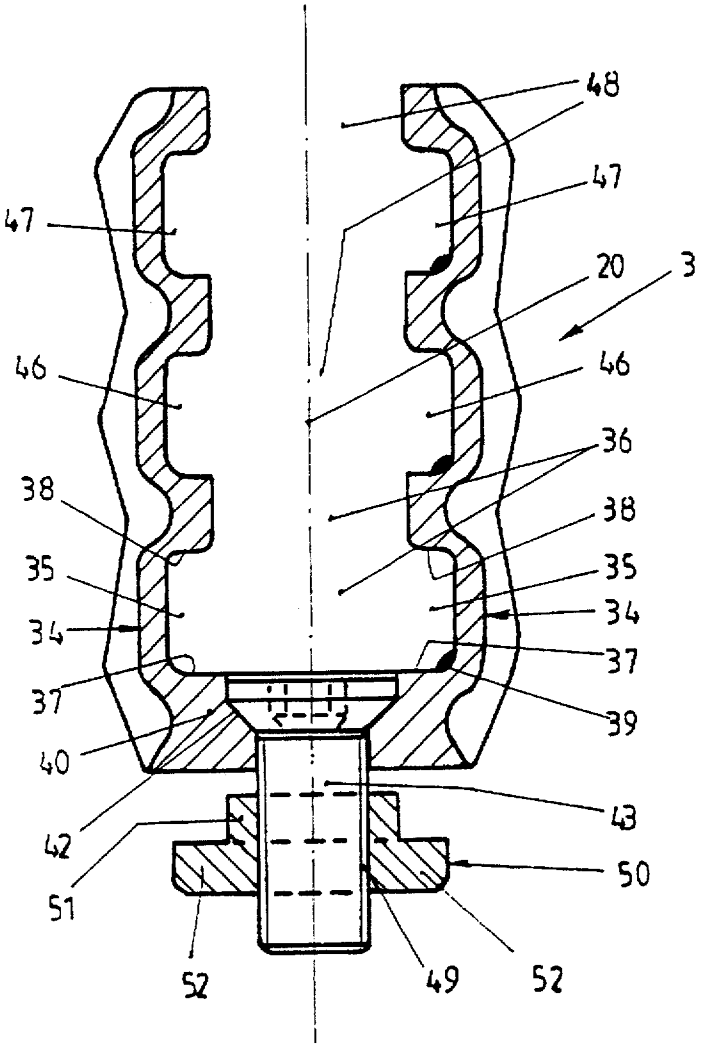
FIG. 7 shows a section through the guide shoe according to FIG. 6, but with a three-storey design.

The guide shoe 3 according to FIG. 1 exhibits, in a symmetrical arrangement with respect to the vertical longitudinal centre plane 20, two side walls 34 which, together, form T-slot-shaped clearances 35 continuing over the length of the guide shoe 3. The side walls 34 leave free between them a cavity 36 which adjoins the clearances 35, with the result that, here, the unit comprising bearing plate 4 and clamping claw 8 can be displaced, and inserted, in accordance with double arrow 5. In this arrangement, the lower guide surfaces 23 of the bearing plate 4 come into operative contact with lower guide surfaces 37 of the clearances 35 and, in the clamping position, the upper guide surfaces 22 of the bearing plate 4 come into operative contact with upper sliding surfaces 38 of the clearances 35. A stop 39 for terminating the displacement movement of the bearing plate 4 in the direction of the workpiece 2 may be provided at the front of the T-slot-shaped clearances 35. The slot 39 may also be intentionally left out in order, with the guide shoe 3 fixed on the clamping table 1, to clamp the workpiece 2 not only in its border region, but also in the direction of its central region. The guide shoe 3 exhibits a floor 40 which, for reasons of weight reduction, is provided with through-passages 41 in its rear region. Provided in the front region are two countersunk bores 42 into which a fastening bolt 43 (FIG. 1) may optionally be inserted in order to fix the guide shoe 3 relative to the clamping table 1 with the aid of a threaded bore 44 provided in the clamping table 1. The side walls 34 of the guide-shoe 3 are provided with ribs 45 which form depressions between them, with the result that the side walls 3, in spite of the weight reduction, are of a rigid design. The guide shoe 3 according to FIG. 6 is of a somewhat longer design than the guide shoe 3 of the embodiment according to FIG. 1. However, the two guide shoes 3 are designed, as it were, in a single-storey manner, i.e. they have only one arrangement of T-slot-shaped clearances 35. In contrast, that embodiment of the guide shoe 3 which is represented in FIG. 7 is designed, as it were, in a three-storey manner, i.e. pairs of T-slot-shaped clearances 35, 46 and 47 are provided in each case in different vertical positions with respect to one another, the basic construction of all the pairs of clearances, including the corresponding functional surfaces, however, being of a corresponding design. The cavity 36 continues upwards in a continuous cavity 48, i.e., even in the case of a three-storey design, a continuous cavity 36, 48 is provided between the side walls 34. This makes it possible for the unit comprising bearing plate 4 and clamping claw 8 to be inserted optionally into the clearances 35 or the clearances 46 or the clearances 47 in order to be able to clamp workpieces 2 of different heights with a device which is unchanged in this respect. In particular if a workpiece 2, for the machining, has to be clamped a number of times in relative positions which are rotated with respect to one another and clamping positions of different heights thereby turn out to be necessary, these conditions can be satisfied without changing the guide shoe 3.

The fastening bolt 43 inserted into the bore 42 is assigned a sliding block 50 provided with an internal thread 49, with the result that fastening in a clamping table 1, which exhibits corresponding slots instead of the threaded bores 44, is thus possible. The sliding block 50 expediently has a rectangular outline, to be precise both in the region of a base 51 and in the region of anchorage continuations 52. The rectangular outline creates pairs of anchorage continuations 52 with different geometrical dimensions. One of these two pairs of anchorage continuations 52 may expediently be matched, in terms of its geometry, to the geometry of the grooves in the clamping table 1. As a rule, these are comparatively narrow grooves. The other pair of anchorage continuations 52 is matched, in terms of its geometry, as represented in FIG. 7, to the geometry of the T-shaped slots 35—and thus also of the clearances 46 and 47. This provides the possibility of positioning two identically designed guide shoes 3, for example, which may both be of a single-storey configuration, one upon the other and of fastening them on the clamping table 1 by means of the sliding block 50 of the lowermost guide shoe 3, while the corresponding sliding block 50 of the upper guide shoe 3 engages, in a relative position rotated through 90°, into the clearances 35 of the lower guide shoe 3. Consequently, relatively high workpieces 2 can then be clamped, and it goes without saying that the bearing plate 4 with the clamping claw 8 are inserted into the clearances 35 of the upper guide shoe 3. This arrangement of a plurality of guide shoes 3 one upon the other in order to be able to clamp relatively high workpieces 2 takes place irrespective of whether the guide shoes of a single-storey or multi-storey type are used.

Figure 8:
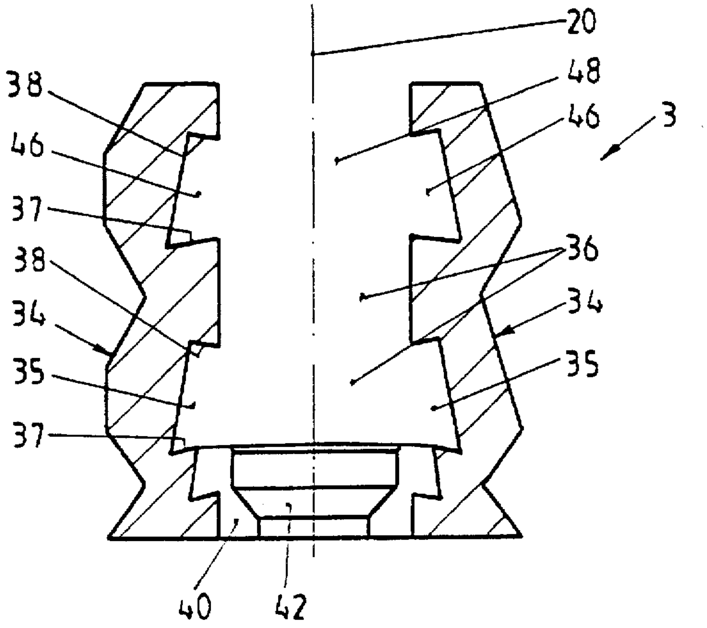
FIG. 8 shows a section through a two-storey guide shoe.

FIG. 8 shows a guide shoe 3 of a two-storey type. Here, the pairs of T-slot-shaped clearances 35 and 46 are of a dovetail design, i.e. the lower sliding surfaces 37 and the upper sliding surfaces 38 are not horizontal here, but are of a sloping design. It goes without saying that the upper guide surfaces 22 and the lower guide surfaces 23 on the protrusions 21 of the bearing plate 4 have to be designed correspondingly. This dovetail-like design has the advantage that the side walls 34, in the clamping position, are subjected to reduced bending because the oppositely oriented arrangement of the sloping surfaces result in comparative release from bending of the side walls 34 in the clamping position. The surfaces 37, 38 and 22, 23 may also be designed as spherical or Convex bearing surfaces in order to permit a slight degree of adaptation of the unit comprising bearing plate 4 and clamping claw 8 about a horizontal axis in the vertical longitudinal centre plane 20 if the clamping surface on the workpiece 2 is, for example, uneven.

Figures 9, 10:
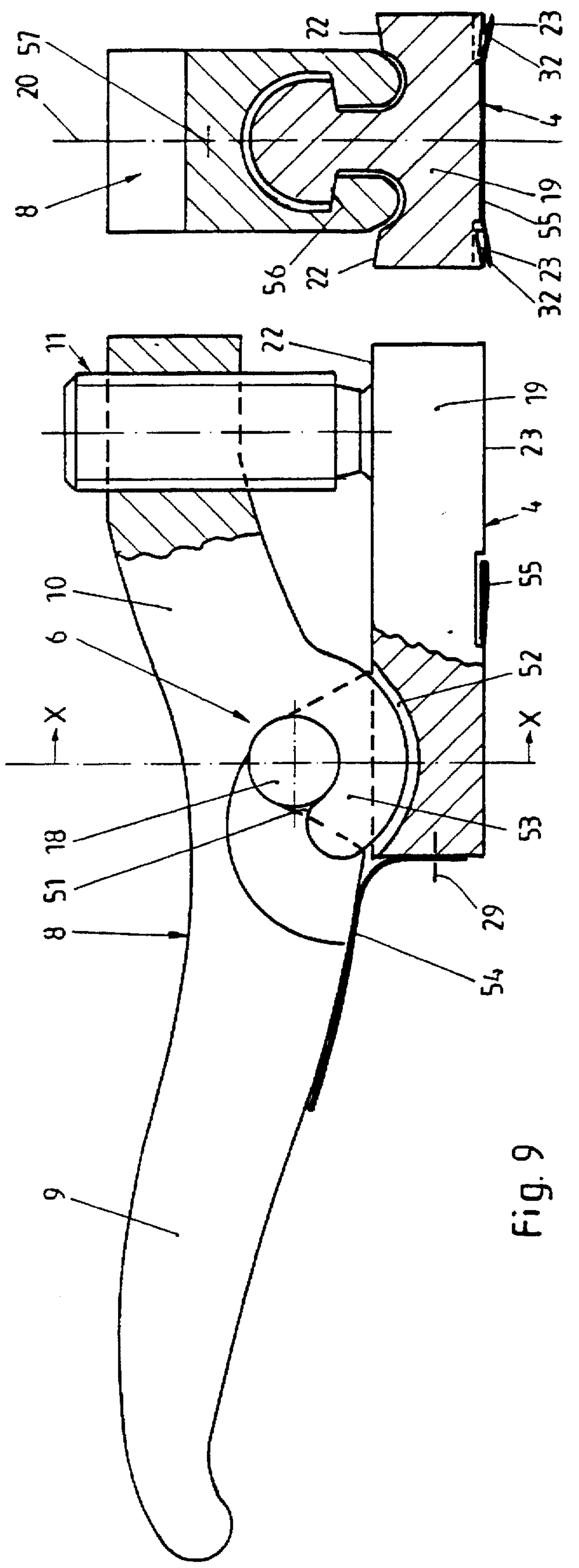
FIG. 9 shows a side view of essential parts of the device in one embodiment.
FIG. 10 shows a section along line X—X in FIG. 9, but in a further embodiment.

FIG. 9 represents an embodiment of the device, in the case of which the connection between the bearing plate 4 and the clamping claw 8 in the bearing 6 constitutes, as it were, a reversal of the embodiment according to FIG. 1. The bolt-like protrusions 18, here, are seated on a web 51 which is connected to the basic body 19 of the bearing plate 4. The web 51 is adjoined to the right and left of the vertical longitudinal centre plane 20 by depressions 52 into which there engage bearing shells 53 which, for their part, form a constituent part of the clamping claw 8. The spring 28 is replaced here by two springs 54 and 55. The spring 54 is fastened on the basic body 19 of the bearing plate 4 by means of rivets 29 and, otherwise, fulfils a function on the clamping claw 8 in the clockwise direction of rotation. The spring 55 serves to increase the friction against automatic displacement of the bearing plate 4 relative to the guide shoe 3.

The embodiment according to FIG. 10 shows spherical bearing surfaces 56 between the bearing plate 4 and the clamping claw 8, with the result that, given the play provided, slight rotary movements relative to a horizontal axis 57 in the vertical longitudinal centre plane 20 are also possible. The upper guide surfaces 22 and the lower guide surfaces 23 are arranged in the form of dovetails on the basic body 19 of the bearing plate 4, as has already been described for the guide shoe 3 according to FIG. 8. The lugs 32 of the spring 55 projects some way downwards in a non-loaded state.

Figure 11:
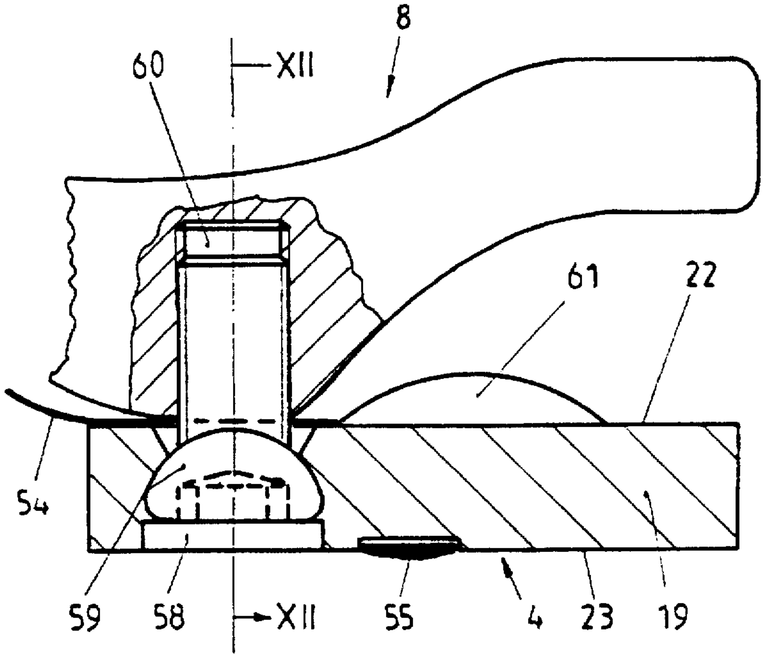
FIG. 11 shows a detail of a further embodiment.
Figure 12:
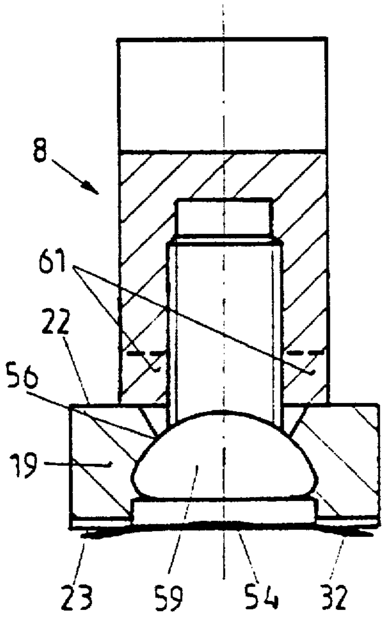
FIG. 12 shows a section along line XII—XII in FIG. 11.

The embodiment of FIG. 11 shows a further possible fastening method between clamping claw 8 and bearing plate 4. The basic body 19 of the bearing plate 4 has, in its front region, a through-passage 58 into which there is inserted a spherical-collar bolt 59 which is inserted into a threaded bore 60 in the clamping claw 8. The spherical collar bolt 59 passes through, and also secures, the spring 54, while the spring 55 is fastened in the same way as in the exemplary embodiment of FIG. 9. The basic body 19 exhibits reinforcement ribs 61 which extend in the longitudinal direction of the basic body 19. In this embodiment too, spherical bearing surfaces 56 are produced with the aid of the spherical collar bolt 59.

Figure 13:
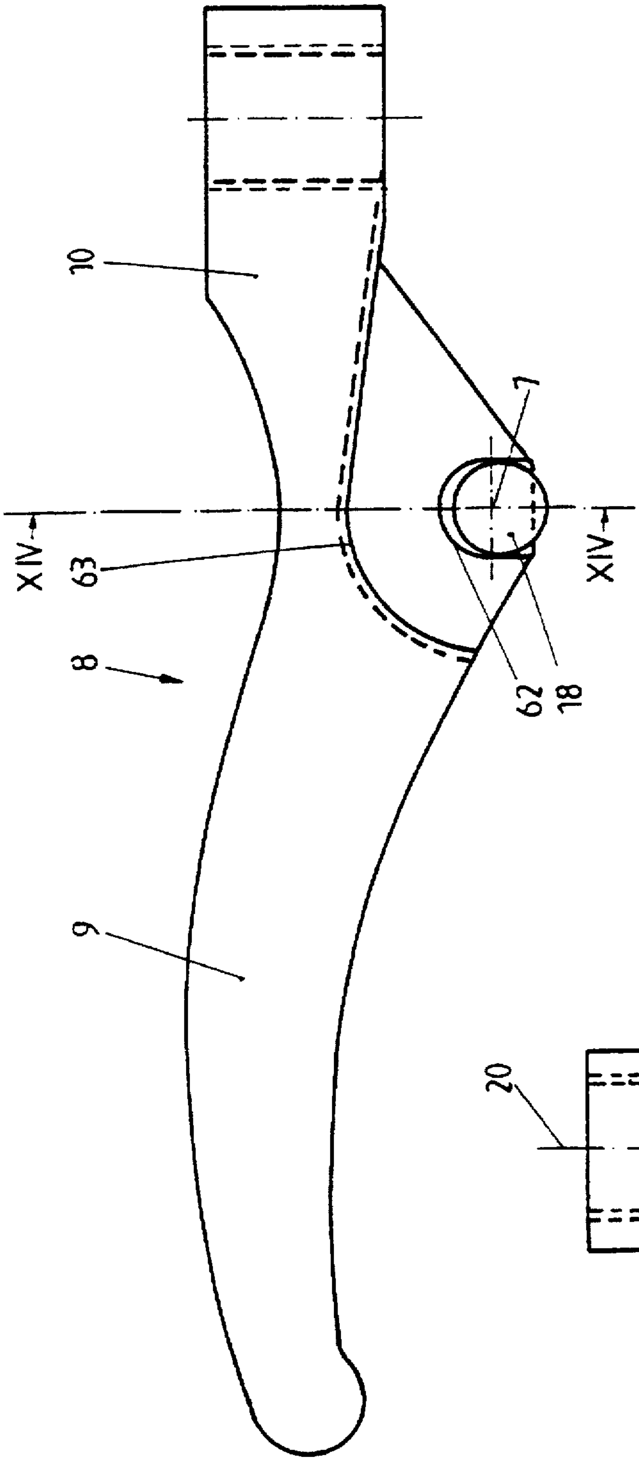
FIG. 13 shows a side view of a further clamping claw.
Figure 15:
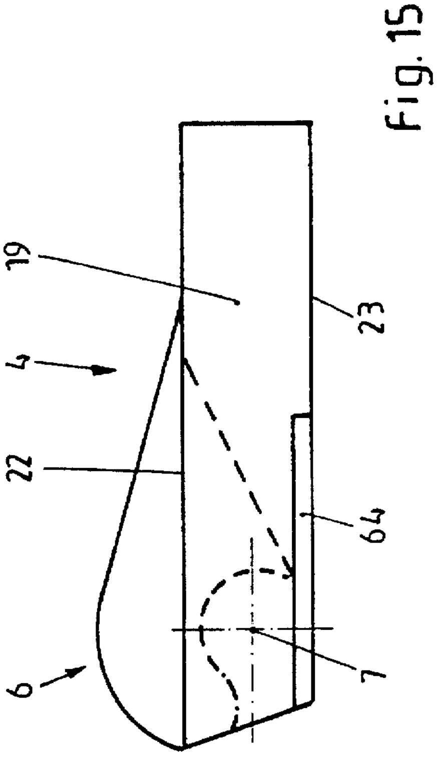
FIG. 15 shows a side view of the bearing plate according to FIG. 14.
Figure 14:
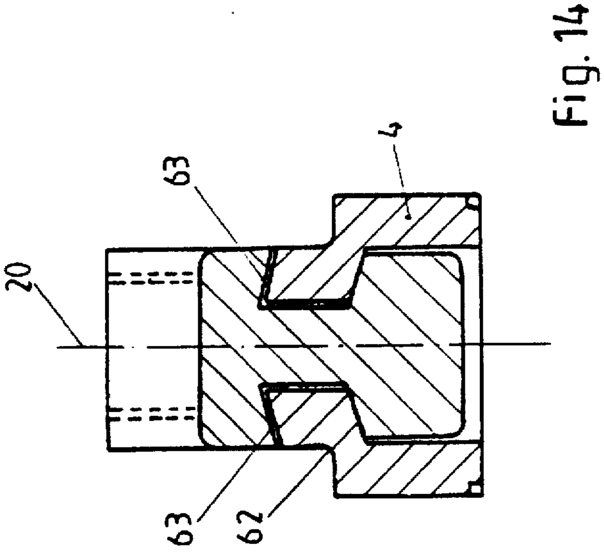
FIG. 14 shows a section along line XIV—XIV in FIG. 13, with representations of the bearing plate.

A further embodiment is represented in FIGS. 13 to 15. Here too, the clamping claw 8 is designed in the manner already described, i.e. it has the bracing leg 9 and the clamping leg 10. The protrusion 18 is provided on its upper side, as can be seen, in particular, in FIG. 13, with a convex sloping surface 62, which is designed symmetrically with respect to the longitudinal centre plane 20 (FIG. 14). If the clamping force is applied by means of the clamping bolt (not shown here), the two side walls of the bearing plate 4 are spread apart slightly. This movement is terminated by an intercepting surface 63, likewise symmetrical with respect to the longitudinal centre plane 20. The intercepting surfaces 63 likewise run in a sloping manner. FIG. 15 shows the associated bearing plate, which is designed in a manner similar to the exemplary embodiment of FIG. 3. In the region of the lower guide surface 23, the basic body 19 has, on one side, a milled-out slot 64 which interacts with the stop 39 (FIG. 7), with the result that, in this manner, the relative advancement of the bearing plate 4 beyond the guide shoe 3 is made possible and the maximum possible advancement is restricted in this respect.

Figure 16:
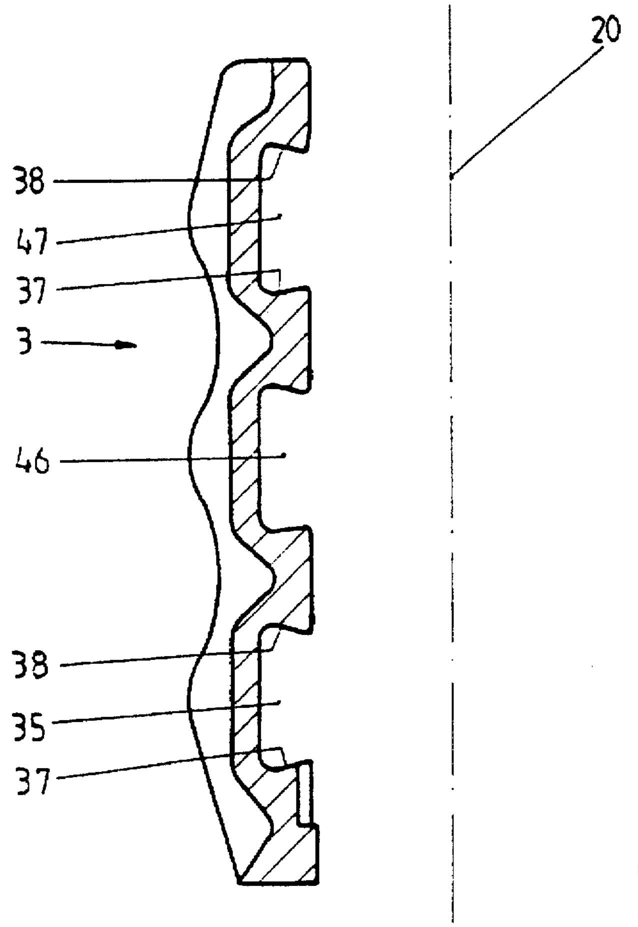
FIG. 16 shows a sectional representation of half of a guide shoe.
Figure 17:
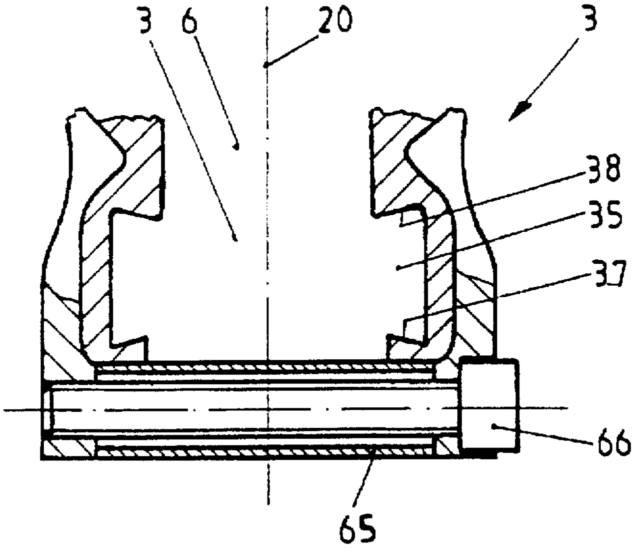
FIG. 17 shows an assembled guide shoe.

The guide shoe 3 represented in FIG. 7 is of a three-storey design. Its lower sliding surfaces 37 and its upper sliding surfaces 38 run parallel to one another. FIG. 8 shows a guide shoe in which the sliding surfaces 37 and 38 slope with respect to one another in the form of a dovetail. In order to facilitate the production of such sloping sliding surfaces, it is expedient to divide the guide shoe 3'. FIG. 16 shows one half of a guide shoe 3, of which the clearances 35, 46, 47 can be produced in a simple manner by means of a conical face mill and, if appropriate, can also be finish-milled. This results in the sliding surfaces 37 and 38 sloping with respect to one another. It goes without saying that a complete guide shoe 3 includes a further part of mirror-inverted design, as can seen in FIG. 17. In order to connect the parts to one another, a spacer sleeve 65 and a clamping bolt 66 are provided in order to screw the two parts of the guide shoe 3 to one another. A plurality of such screwing locations are expediently provided over the length of the guide shoe 3.

| LIST OF DESIGNATIONS | |
|---|---|
| 1 Clamping table | 11 Clamping bolt |
| 2 Workpiece | 12 Threaded bore |
| 3 Guide shoe | 13 Attachment surface |
| 4 Bearing plate | 14 Screwing tool |
| 5 Double arrow | 15 Supporting body |
| 6 Bearing | 16 Supporting surface |
| 7 Axis | 17 Central web |
| 8 Clamping claw | 18 Protrusion |
| 9 Bracing leg | 19 Basic body |
| 10 Clamping leg | 20 Longitudinal centre plane |
| 21 Strip-like protrusion | 31 Region |
| 22 Upper guide surfaces | 32 Lug |
| 23 Lower guide surfaces | 33 Depression |
| 24 Clearance | 34 Side wall |
| 25 Depression | 35 Clearance |
| 26 Push-in opening | 36 Cavity |
| 27 Guide surface | 37 Lower sliding surface |
| 28 Spring | 38 Upper sliding surface |
| 29 Rivet | 39 Stop |
| 30 Part | 40 Floor |
| 41 Through-passage | 51 Web |
| 42 Bore | 52 Depression |
| 43 Fastening bolt | 53 Bearing shell |

-continued

| LIST OF DESIGNATIONS | |
|---|---|
| 44 Threaded bore | 54 Spring |
| 45 Rib | 55 Spring |
| 46 Clearance | 56 Bearing surface |
| 47 Clearance | 57 Axis |
| 48 Cavity | 58 Through-passage |
| 49 Internal thread | 59 Spherical collar bolt |
| 50 Sliding block | 60 Threaded bore |
| 61 Reinforcement rib | 64 Slot |
| 62 Sloping surface | 65 Spacer sleeve |
| 63 Intercepting surface | 66 Clamping bolt |

I claim:

1. A device for securely clamping a workpiece on a clamping table, the device comprising:

a guide shoe arranged and configured to be fastened on the clamping table, the guide shoe including a substantially longitudinal body, a substantially flat bottom surface arranged and configured to engage a top surface of the table, first and second side walls extending upward from the bottom surface, a central longitudinal space between the first and second side walls, a longitudinal slot disposed on each side wall adjacent the longitudinal space, wherein the side walls, longitudinal space and slots form an inverted T-shaped cross-section which extends over the length of the guide shoe:

a clamping claw including a first end, a second end and a center portion disposed between the first and second ends, the clamping claw arranged and configured to form a tilting lever pivotable about the center portion, the clamping claw including a clamping leg at the first end, a bracing leg disposed at the second end, and a bearing surface disposed in the center portion;

a clamping bolt arranged and configured to pass through the clamping leg and fix the bracing leg into a clamping position such that the bracing leg securely clamps the workpiece against the table;

a bearing plate disposed between the guide shoe and the clamping claw, the bearing plate including first and second longitudinal protrusions which are complementary in shape to the slots in the first and second side walls of the guide shoe, respectively, wherein the bearing plate is guided in a longitudinally sliding manner in the T-shaped cross-section, the bearing plate further including a bearing surface on a top portion thereof for pivotally receiving the bearing surface disposed on the center portion of the clamping claw such that the clamping claw pivots with respect to the bearing plate; and wherein the clamping bolt is threadingly received through the second end of the clamping claw and adapted to engage the bearing plate to pivot the clamping claw about its bearing surface to pivot the bracing leg into the clamping position, to secure the workpiece against the table and stabilize the bearing plate with respect to the guide shoe;

whereby disengagement of the clamping bolt from the bearing plate allows the bearing plate to longitudinally translate with respect to the guide shoe for repositioning the clamping leg inward from a border portion of the workpiece.

2. The device according to claim 1, further comprising:

a fastening bolt for attaching a sliding block to a bottom portion of the bearing plate, the sliding block having first and second longitudinal protrusions which complimentarily engage the first and second longitudinal slots in the guide shoe, wherein the sliding block increases a height of the clamping claw with respect to the table surface, and wherein the sliding block is configured to longitudinally translate with respect to guide shoe when the clamping bolt is disengaged from the bearing plate to allow the bearing plate to longitudinally translate with respect to the guide shoe for repositioning the clamping leg inward from a border portion of the workpiece.

3. The device according to claim 1, wherein the guide shoe further comprises:

at least two pairs of longitudinal slots, wherein slots within each pair are disposed opposite one another on the first and second side walls of the guide shoe and wherein the pairs are arranged one above the other in horizontal planes,, continue over the length of the guide shoe, and receive the bearing plate at vertical positions corresponding to the height of each slot pair for varying a height of the clamping claw with respect to the table top.

4. The device according to claim 1, wherein the guide shoe includes through-passages for weight reduction.

5. The device according to claim 1, wherein the bearing surface disposed on the bearing plate is convex in shape and the bearing surface on the clamping claw is concave.

6. The device according to claim 1, wherein the slots in the guide shoe include a concave cross-section and the protrusions of the bearing plate are complementary in cross-sectional shape to the slots.

7. The device according to claim 1, wherein the slots are of a dovetail-shaped cross-section.

8. The device according to claim 1, further comprising:

bolt-like protrusions on the clamping claw bearing surface; and complementary depressions which are open in a downward direction in the bearing plate, wherein the depressions are arranged and configured to pivotally receive the bolt-like protrusions.

9. The device according to claim 8, wherein the clamping claw further comprises a central web from which the bolt-like protrusions project symmetrically, and wherein the longitudinal space between the guide shoe side walls receives the central web.

10. The device according to claim 1, wherein the bearing plate is of a length which corresponds approximately to one third to one half the length of the clamping claw.

* * * * *